United States Patent
Wesby (10) Patent No.: US 12,063,311 B2
(45) Date of Patent: Aug. 13, 2024

(54) SYSTEM AND METHOD FOR INTERNET ACCESS AGE-VERIFICATION

(71) Applicant: Node A Consulting GmbH, Grünwald (DE)

(72) Inventor: Philip Wesby, Mölnlycke (SE)

(73) Assignee: Node A Consulting GmbH, Grünwald (DE)

( * ) Notice: Subject to any disclaimer, the term of this patent is extended or adjusted under 35 U.S.C. 154(b) by 600 days.

(21) Appl. No.: 16/972,325

(22) PCT Filed: Jun. 4, 2019

(86) PCT No.: PCT/EP2019/064461
§ 371 (c)(1),
(2) Date: Dec. 4, 2020

(87) PCT Pub. No.: WO2019/234004
PCT Pub. Date: Dec. 12, 2019

(65) Prior Publication Data
US 2021/0234705 A1    Jul. 29, 2021

(30) Foreign Application Priority Data
Jun. 5, 2018  (EP) .................................. 18176005

(51) Int. Cl.
*H04L 29/06* (2006.01)
*H04L 9/30* (2006.01)
(Continued)

(52) U.S. Cl.
CPC .............. *H04L 9/3247* (2013.01); *H04L 9/30* (2013.01); *H04L 63/0838* (2013.01)

(58) Field of Classification Search
CPC ..... H04L 9/3247; H04L 9/30; H04L 63/0838; H04L 9/321; H04L 2209/80;
(Continued)

(56) References Cited

U.S. PATENT DOCUMENTS

| | | | |
|---|---|---|---|
| 10,255,445 B1 * | 4/2019 | Brinskelle | G06F 21/606 |
| 2006/0173793 A1 * | 8/2006 | Glass | G06F 16/9535 |
| | | | 707/E17.116 |

(Continued)

FOREIGN PATENT DOCUMENTS

| | | |
|---|---|---|
| EP | 1506667 A1 | 2/2005 |
| WO | 2003/098908 A1 | 11/2003 |

OTHER PUBLICATIONS

European Search Report for Application No. 18176005.9, dated Aug. 21, 2018, 4 pages.

(Continued)

*Primary Examiner* — Joseph P Hirl
*Assistant Examiner* — Leynna Truvan
(74) *Attorney, Agent, or Firm* — McCarter & English, LLP; Jonathan C. Lovely (57) ABSTRACT

A system and method for internet-access age-verification is described which has direct application for controlling access to age-limited internet content, such as gambling sites, by secure communication with an age-verification server. After registering with an age-verification server, the internet user installs a software application on his multimedia device which manages the age-verification transaction between an age-restricted content provider and the age-verification server whenever the user attempts to access age-restricted content. The invention maintains anonymity between the user and the content provider yet provides secure and authenticated verification of the age of the user. No user website data is transmitted to the age-verification server, thus maintaining the privacy of the internet user.

23 Claims, 6 Drawing Sheets

(51) Int. Cl.
*H04L 9/32* (2006.01)
*H04L 9/40* (2022.01)

(58) Field of Classification Search
CPC ............... H04L 9/3271; H04L 63/0823; H04L 2209/42; H04L 63/0876; H04L 9/088; H04W 12/06; H04W 12/02; H04W 72/1221; H04N 21/25883; H04N 21/4753; G07B 2017/00766; H04M 2215/0156; G06V 40/33; G06K 9/00161; G05B 2219/24154; G05B 2219/24167; G05B 2219/36542; G06Q 20/206; G07C 9/23; G07C 9/33; G10H 2240/111; G11B 20/00152
See application file for complete search history.

(56) References Cited

U.S. PATENT DOCUMENTS

| | | | |
|---|---|---|---|
| 2006/0235796 A1 | 10/2006 | Johnson et al. | |
| 2007/0044143 A1 | 2/2007 | Zhu et al. | |
| 2013/0072280 A1* | 3/2013 | Yacenda | G07F 17/3225 463/17 |
| 2013/0318359 A1 | 11/2013 | Morris et al. | |
| 2020/0186355 A1* | 6/2020 | Davies | H04L 9/3221 |

OTHER PUBLICATIONS

International Search Report and Written Opinion for Application No. PCT/EP2019/064461, dated Jul. 9, 2019, 11 pages.

\* cited by examiner

SYSTEM AND METHOD FOR INTERNET ACCESS AGE-VERIFICATION

CROSS-REFERENCE TO RELATED APPLICATIONS

This application is a U.S. national stage filing, under 35 U.S.C. § 371(c), of International Application No. PCT/EP2019/064461, filed on Jun. 4, 2019, which claims priority to European Patent Application No. 18176005.9, filed on Jun. 5, 2018. The entire contents of each of the aforementioned applications are incorporated herein by reference.

Background of the Invention

The invention relates to an improved system and method for internet-access age-verification which has direct application for controlling access to age-limited internet content, such as gambling sites.

Today many internet websites have age-restricted content such as gambling websites, where a user must be above the age of 18 years before he or she may access those websites. Today there is no safe and secure means to manage the age-verification transaction. Some under-age users attempt to access the content fraudulently by providing false identity information, while others are concerned that their personal identity information may be misused by third parties should it be accessed by non-legitimate persons.

Today, internet users register to use age-restricted content such as gambling websites by providing significant personal identity information including their banking details for payment. This personal data is then stored by content provider and is vulnerable to misuse by third parties. Internet users would prefer a means which did not require the content provider to store their personal data. In addition, internet users prefer to access content anonymously such that no third party may judge them by their actions.

An improved system and method for internet-access age-verification is needed which provides both a secure means to authenticate an internet user and verify the user's age, while maintaining their anonymity such that their personal data is not sent to the content provider and their internet use data is not sent to an age-verification server. This aspect is not present in the prior art. The invention is a technical improvement over the prior art and provides a method to solve the aforementioned prior art problems.

The invention addresses the problems of the prior art by managing the internet access transactions in such a way that the internet user remains anonymous from the content provider, by enabling the user to provide a separate user name when setting up the account, whilst providing the means for the content provider to authenticate the anonymous user with an age-verification server. The key to the invention is to provide a means to access the age-restricted content via a software application running on the internet-user's multimedia device which separately manages the communication with the content provider and the communication with the age-verification server.

In general, all multimedia devices comprise hardware identity information. For example, mobile network devices use SIM cards which comprise unique ID codes such as the PUK code. Wi-Fi wireless devices all have unique hardware MAC addresses, and hardware processing chips comprise unique ID codes, both of which may be read by software. There are many identity codes within a device, which can uniquely identify the multimedia device which a user is using to access internet content.

Software applications can be uniquely locked to a multimedia device when they are installed, for example by using a one-time use installation password. Once a software application is installed using this password and registered, it may not be transferred to operate on any other device.

In the field of age-verification, dedicated age-verification servers do not generally exist, although databases with substantial personal information do exist such as health data records, and personal banking data records, and social security data records.

In the evolving Internet-of-Things (IOT), an increasing number of autonomous systems are being developed which incorporate server-based application management. This invention describing an improved system and method for Internet access age verification builds upon a core aspect of EP 1,506,667 B1 in which consumer devices and their operation are managed by server platform software applications.

With the growing number of instances of security breaches of systems storing confidential personal data, many consumers are getting increasingly concerned about adopting services which demand storing their confidential data. Moreover, this confidential data is often retained by the service companies, and used to improve their service provision, and or sold to third party companies for marketing purposes.

Service providers demand this confidential data to verify one or more of the following:
  the identity of a consumer using their service,
  the email address where a consumer may be contacted,
  the postal address where a consumer may be found,
  the telephone number of the consumer, The invention addresses all the problems of the prior art systems by isolating personal identity data, which is required by an age-verification process in order to register that a person is of legal age to access age-restricted internet content, from the content provider. The content provider only needs to verify, using a secure and authentic means, that the internet user is old enough to access the age-restricted content. The content provider does not need, and the internet user does not wish to provide, any unneeded personal identity data which may be lost or misused. According to the invention, an age-verification server provides an isolated and independent means for a content provider to verify the age of an internet user who is attempting to access age-restricted content. The internet user does not wish to provide, and the age-verification server does not need to store, data about their internet access history. Often this internet access history is used by third parties for targeted marketing purposes and many internet users find such use an invasion of their privacy.

In summary, an improved system and method for internet-access age-verification is needed which is anonymous, which enables a content provider to verify securely that an internet user is old enough to access the content, or the service disconnects. The invention provides a means to regulate internet access by encrypting any transmission of any user identity data and by managing the internet access process through a software application which is identified to be uniquely associated with a particular user and a particular device.

Today, governments recognize that online gambling and age-restricted internet content are socially damaging for young people and are demanding an independent authentic means to verify securely that an internet user is old enough to access such internet content. Gambling is addictive and an increasing number of users accessing such online gambling sites, are falling into debt because no means exists to manage and limit the amount of money they gamble. Furthermore, the time that users spend online is also a factor which needs to be managed and limited to help prevent them developing addictive behaviours such as playing online games or gambling endlessly. In other areas, internet shoppers would benefit from a means that would keep them aware of the amount of money they are spending to help them avoid overspending.

Regulating the Internet is a challenging task, given the diversity of Internet services and content, nevertheless, such regulation is needed in order to protect the developing minds of children from violent images and unsuitable content. Some services, like online gambling, are harmless in moderation and enjoyable to adults who are not addicted. In the right context, and to adults above a certain age, most Internet content should be made available if it does not transcend society norms. Democracy and positive society development require freedom of speech and access to all content.

In extended and different embodiments, the current invention further develops the concept of Internet regulation by providing an Internet access platform to regulated content providers. Those content providers who do not comply with societal guidelines, can be made inaccessible through this platform.

While the embodiments are directed towards age verification for age-limited content and Internet services, the invention is also directly applicable to Internet regulation by providing a continually-updated Internet screening capability. Only those content providers, which continue to uphold current societal values, may be accessible through an Internet content regulating platform, according to the current invention.

Content providers, who wish to be accessible via the Internet Regulating software platform, are screened during their registration process, and granted an Internet access license so that they are presented as accessible via the said platform. This registration screening involves having the content and services checked according to specific criteria such that the content does not breach government and morally-acceptable guidelines. Content and services, which the screened and registered content provider offers, may be periodically reviewed such that the Internet access license via the platform is renewed, thus maintaining the standard of the content offered.

It is thus towards the creation of an advanced and improved system and method for internet-access age-verification, which comprises technological improvements over prior art systems, and which has the capability to both allow an internet user to remain anonymous while accessing age-restricted internet content, and which provides a secure and authentic means for a content provider to communicate with an age-verification server to determine that the anonymous user is age-verified, wherein no confidential personal data is transmitted to the content provider, and wherein no internet access user data is transmitted to the age-verification server, that the current invention of an improved system and method for internet access age-verification is directed.

ASPECTS OF THE INVENTION

Accordingly, it is an aspect of the present invention to provide an improved system and method for internet-access age-verification, which securely determines that an internet user is old enough to access age-restricted internet-content by providing the means for a content provider to verify the age of an anonymous internet user by communicating with an age-verification server through a software application installed on the user's smart phone or multimedia device wherein no confidential personal identity data is transmitted to the content provider, and wherein no internet access user data is transmitted to the age-verification server.

It is a further aspect of one embodiment of the present invention to provide an improved system and method for internet access age-verification wherein a software application is installed securely on a user's smart phone or multimedia device which manages the communications between an age-restricted internet content provider and an age-verification server to enable a user to be age-verified, wherein the user remains anonymous to the content provider by communicating with the content provider under a user-pseudonym, and wherein the identity of the smart phone or multimedia hardware device is not transmitted to the content provider by providing a derivative of the hardware device identity to the content provider, and wherein the software application is able to authenticate the content provider, and provide the means for the content provider to communicate through the software application with the age-verification server in order to verify that the anonymous user is age-verified, and is communicating with an authenticated software application and via an authenticated smart phone or multimedia device which is identified as registered to the age-verified user.

It is a further aspect of one embodiment of the present invention to provide an improved system and method for internet access age-verification wherein the age-restricted content provider registers with an age-verification server and the content provider is added to the software application permitted content providers list, either automatically, or directly, or whenever the software application is updated such that the user can only use the software application to obtain age-verification for registered content providers.

It is a further aspect of one embodiment of the present invention to provide an improved system and method for internet access age-verification wherein a user first registers their true identity (User-A) and age with an authentic age-verification server, then the user installs an internet access management software application (App) on their smart phone or multimedia device using a one-time password, and wherein the software application is registered to one unique smart phone or multimedia device hardware identity (HW-ID) such that the software application identity (App-ID) together with a derivative of the device identity, are uniquely identifiable as being associated with one unique user (User-A), and wherein by registering the software application and a derivative of the device identity App-ID1 (HW-ID) with an age-verification server using the true identity of the user already registered with the age-verification server (User-A), the server is able to authenticate and store and validate that the combined software and hardware identity App-ID1(HW-ID) is uniquely associated with an authenticated user who has been age-verified (User-A).

It is a further aspect of one embodiment of the present invention to provide an improved system and method for internet access age-verification wherein the age-verification server stores the association between i) an authenticated software application (App) identity and a derivative of the identity of the user smart phone or multimedia device on which the software is installed App-ID1(HW-ID), and ii) the previously registered user identity (User-A), such that whenever the software application communicates with the age-verification server, the communication of only the combined software and hardware identity App-ID1(HW-ID), uniquely identifies the true identity of the user (User-A).

It is a further aspect of one embodiment of the present invention to provide an improved system and method for internet access age-verification wherein the age-verification server communicates with the software application (App) using an encrypted connection such that the unique combined software and hardware identity App-ID1(HW-ID) is only known to the age-verification server and may not be determined independently by a third party.

It is a further aspect of one embodiment of the present invention to provide an improved system and method for internet access age-verification wherein a user registers with an age-restricted content provider according to the following steps of:

a user registers with an age-restricted content provider using an internet access management software application (App), wherein during registration, the user registers using a unique pseudonym (User-C) and the App communicates the pseudonym (User-C) together with the identity of the age-verification server (AV) to the content provider, the content provider requests the public key of the age-verification server (AVPubK) and generates and stores a temporary random identity for User-C(Rand1), the content provider sends the temporary random identity Rand1 back to the App, and wherein the App forwards Rand1 together with the unique combined software and hardware identity App-ID1(HW-ID) to the age-verification server, the age-verification server determines that App-ID1(HW-ID) is associated with a stored data file for an age-verified user, in which case the age-verification server signs Rand1 with the private key (AVsig) of the age-verification server to produce AVsig(Rand1), which is then forwarded to the App associated with App-ID1(HW-ID), wherein after the App receives AVsig(Rand1) which confirms that the user is age-verified, the App generates a different unique combined software and hardware identity App-ID2(HW-ID), in order to maintain anonymity of the hardware device from the content provider, which is sent together with AVsig(Rand1) to the content provider, and wherein the content provider decodes AVsig(Rand1) using the public key of the age-verification server (AVPubK) to determine that decoded [AVsig(Rand1)] is identical to the stored Rand1, and then the content provider stores the association of combined software and hardware identity App-ID2(HW-ID) with the anonymous user identity User-C, wherein, an anonymous user identity has been used to register with an age-restricted content provider such that an age-verification server has confirmed that the user is authenticated to access the content, the server identifies that the random identity is associated with an age verified user, and the content provider validates and stores the anonymous user identity together with a unique hardware identity to enable the user to access the content.

It is a further aspect of one embodiment of the present invention to provide an improved system and method for internet access age-verification wherein all communications between the software application and the content provider and the age-verification server are encrypted.

It is a further aspect of one embodiment of the present invention to provide an improved system and method for internet access age-verification wherein a user requests to access age-restricted internet content using an internet access management software application (App), and wherein the user is already registered and age-validated with that content provider as anonymous User-C, and wherein the content provider has stored a unique hardware identity for User-C as App-ID2(HW-ID), wherein the user selects the content provider from within the App, and enters the identity User-C, wherein the App computes a one-time password (OTP) based upon the unique hardware identity App-ID2(HW-ID) stored within the App for this content provider, and or a time-varying code which varies in time, e.g. changing every 30 seconds, relative to a time stamp generated uniquely when the device was registered with the content provider and which both the App and the content provider can compute, such that the one-time password (OTP) and the user identity User-C form an authentic user login which the content provider can determine represent an authenticated age-verified user having an authentic registered software application, and thus the content provider can allow access.

It is a further aspect of one embodiment of the present invention to provide an improved system and method for internet access age-verification wherein, in order to operate according to the regulations of the age-verification and be accessible through the internet access management software application (App), the content provider sends a request to register with an age-verification server, wherein, if the age-verification server approves the registration, the server generates a unique identity (Rand2), and then generates an encoded identity, which is the unique identity (Rand2) signed with the private key of the age-verification server AVsig(Rand2), and both the unique identity (Rand2) and the signed unique identity AVsig(Rand2) are stored by the age-verification server, wherein both Rand2 and AVsig (Rand2) are transmitted to and stored by the approved content provider.

It is a further aspect of one alternative embodiment of the present invention to provide an improved system and method for internet access age-verification wherein a user registers with an age-restricted content provider according to the following steps of:

a user registers with an age-restricted content provider using an internet access management software application (App), wherein during registration, the user registers using a unique pseudonym (User-C) and the App communicates the pseudonym (User-C) together with the identity of the age-verification server (AV) to the content provider, the content provider requests the public key of the age-verification server (AVPubK) and generates and stores a temporary random identity for User-C(Rand1), the content provider transmits back to the App of User-C, (a) the temporary random identity (Rand1), together with (b) the stored unique identity (Rand2) and (c) the signed unique identity AVsig(Rand2) generated by the age-verification server during registration of the content provider, upon receipt, the App then applies its copy of the public key of the age-verification server (AVPubK) to decode AVsig(Rand2) and determine that it is equal to (Rand2) in order to verify that the content provider is currently an authentic and approved content provider and then the App forwards (Rand1) together with the unique combined software and hardware identity App-ID1 (HW-ID) to the age-verification server, the age-verification server determines that App-ID1(HW-ID) is associated with a stored data file for an age-verified user, in which case the age-verification server signs Rand1 with the private key (AVsig) of the age-verification server to produce AVsig(Rand1), which is then forwarded to the App associated with App-ID1 (HW-ID), wherein after the App receives AVsig(Rand1) which confirms that the user is age-verified, the App generates a different unique combined software and hardware identity App-ID2(HW-ID), in order to maintain anonymity of the hardware device from the content provider, which is sent together with AVsig(Rand1) to the content provider, and wherein the content provider decodes AVsig(Rand1) using the public key of the age-verification server to determine that decoded [AVsig(Rand1)] is identical to the stored Rand1, and then the content provider stores the association of combined software and hardware identity App-ID2(HW-ID) with the anonymous user identity User-C, wherein, an anonymous user identity has been used to register with an age-restricted content provider such that an age-verification server has confirmed that the user is authenticated to access the content, the App determines that the content provider is authentic and approved, the server identifies that the random identity is associated with an age-verified user, and the content provider validates and stores the anonymous user identity together with a unique hardware identity to enable the user to access the content.

It is a further aspect of one alternative embodiment of the present invention to provide an improved system and method for internet access age-verification in which the internet access management software application (App) further comprises additional features to manage internet access duration to avoid that a user spends too much time on the internet, and features to manage internet spending on both gambling and shopping, which may be set when the software application is installed, such that the App limits the amount of money being gambled within any 24 hour period across all gambling sites, and or limits the amount of money being spent by internet shoppers who may accidently exceed their financial means and run into debt.

Other aspects and advantages of different embodiments of this invention will become apparent from the description to follow when read in conjunction with the accompanying drawings.

BRIEF SUMMARY OF THE INVENTION

Certain of the foregoing and related aspects are readily-attained according to the present invention by the provision of a novel improved system and method for internet access age-verification, which serves to address the diverse requirements for securely managing access of age-restricted content, while maintaining: privacy of the personal identity of the user from the content provider, privacy of the physical identity of the smart phone or multimedia device from the content provider, and privacy of access of age-restricted internet content by the user from the age-verification server.

The invention comprises substantial technical improvements over all prior art systems by providing an internet access management software application (App) which protects the identity of an internet-user from the content provider by enabling the user to access the age-restricted content under a pseudonym, while providing a secure means for the content provider to validate that the user is genuine and age-verified with an age-verification server.

In different embodiments, the invention further creates a valuable solution to an important social problem by regulating access to age-restricted content, and further provides the means to limit and regulate a user's internet-access duration, as well as providing the facility to manage their internet spending and gambling by actively controlling spending and gambling according to preset limits across all gambling sites and or all internet shopping sites, thereby further reducing the chance of falling into debt.

Other objects and features of the present invention will become apparent from the following detailed description considered in connection with the accompanying drawings, which disclose several key embodiments of the invention. It is to be understood, however, that the drawings are designed for the purpose of illustration only and that the particular description of the invention in the context of age-verification for accessing gambling sites is given by way of example only, to help highlight the advantages of the current invention and do not limit the scope of the invention.

DESCRIPTION OF A PREFERRED EMBODIMENT

Reference will now be made in detail to some specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as defined by the appended claims.

The following description makes full reference to the detailed features, which may form parts of different embodiments as outlined in the aspects of the invention. In the following example, reference is made to a user accessing an age-restricted gambling internet website, while it will be obvious that the internet access age-verification invention is suitably applied to a wide range of age-restricted content websites.

Figure 1:
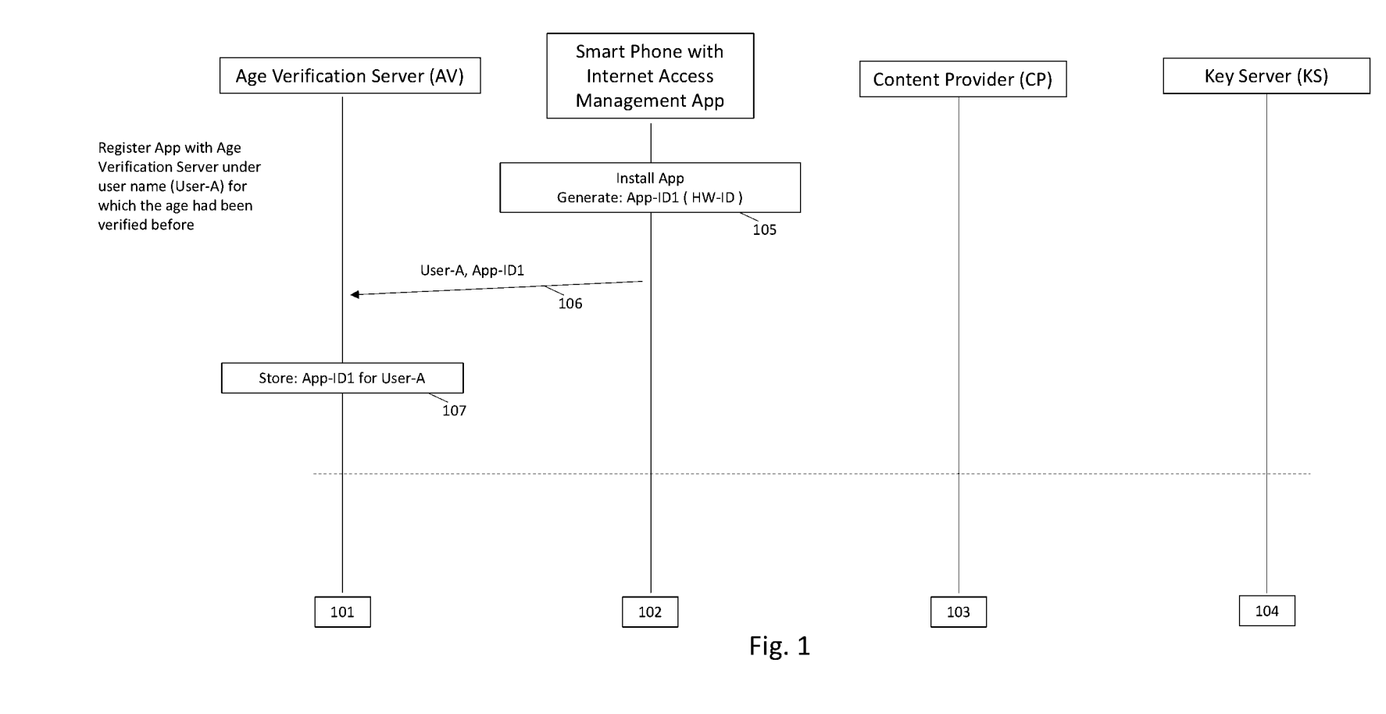
FIG. 1 illustrates a schematic showing one embodiment of the steps performed when the internet access management software application is installed and registered with the age-verification server.

Referring now in detail to the drawings and in particular FIG. 1 thereof, therein illustrated is a schematic of one step of the improved system and method for internet access age-verification as according to one embodiment of the invention. After a user has legitimately registered with an age verification server using a personal ID card or passport or authenticated personal identity of some type or an electronic authenticated identity, the user's true age and identity (User-A) are stored and exist on an age verification server (101).

FIG. 1 shows a logical layout of network elements and communication links between an age-verification server (AV) (101), a smart phone comprising an internet access management software application (App) (102), a content provider (103) and a public-encryption-key server (104) which provides the public key for legitimate users to decrypt files encoded with a private key.

To make use of the age-verification process to access age-restricted content, a user with true identity (User-A) installs an internet access management software application on their smart phone (102). Installation can be done using a one-time installation key or password, which cannot be used a second time such that the software application is locked to that smart phone. The software application (App) generates a unique software application identity App-ID1(HW-ID) (105), which in different embodiments may include a derivative of the smart phone hardware identity such as for example a derivative of the hardware MAC address, and or the chip ID. In this way, the software application identity (App-ID1) together with a derivative of the device identity (HW-ID), are uniquely identifiable as being associated with one unique user (User-A).

The App must now register with the age-verification server (101) and the App sends the true identity (User-A), which the user used originally to register with the age-verification server, together with the unique software application identity [User-A, App-ID1(HW-ID)] to the age-verification server as an App registration request process (106).

The age-verification server (101) receives and processes the registration request (106) and verifies that User-A has registered originally with the age-verification server, and the unique software application identity App-ID1(HW-ID) is stored (107) linked to true identity User-A. The age-verification server thus stores a relation between a uniquely identifiable age-verified user (User-A), an authenticated software application (App) and a uniquely identifiable smart phone using the unique software application identity App-ID1(HW-ID). In an age verification process, only the unique software application identity App-ID1(HW-ID) needs to be transmitted to the age-verification server because it uniquely defines the user and the smart phone for an age-verified user.

In different embodiments, the unique software application identity [User-A, App-ID1(HW-ID)] is sent in an encrypted form and is not ever accessible to 3rd parties. Consequently, no user could ever successfully spoof the identity App-ID1 (HW-ID) and thus fraudulently obtain a successful age-verification.

In different embodiments, the registration process provides a mechanism for the age-verification server to investigate the integrity of the installed internet access management software application to determine that it is authentic and genuine and has not been modified in any unauthorized way. To perform this integrity evaluation, the age-verification server may send one or more encrypted communications comprising an App-challenge communication to the App which requires a specific App-response to be sent back to the age-verification server. If the age-verification server receives the correct App-response, the App is determined to be authenticated and genuine and unmodified. Periodically, the age-verification server may perform App integrity checks to determine if the software has been modified in any way.

In different embodiments, upon successful registration of the App with the age registration server, acknowledgement messages, and or App software updates, and or new App features, and or lists of new content providers, and or activation messages which require the user to set internet access duration limits and or spending limits, and or time-limited spending limits, may be sent back to the App.

In different embodiments, the App may periodically request data to verify that the true user is using the software App to access age-restricted internet content, such that the App may request biometric input, such as a fingerprint scan, and or an iris scan, and or face recognition, and or answers to unique personal security questions, before internet access, and or during use of the App.

Figure 2:
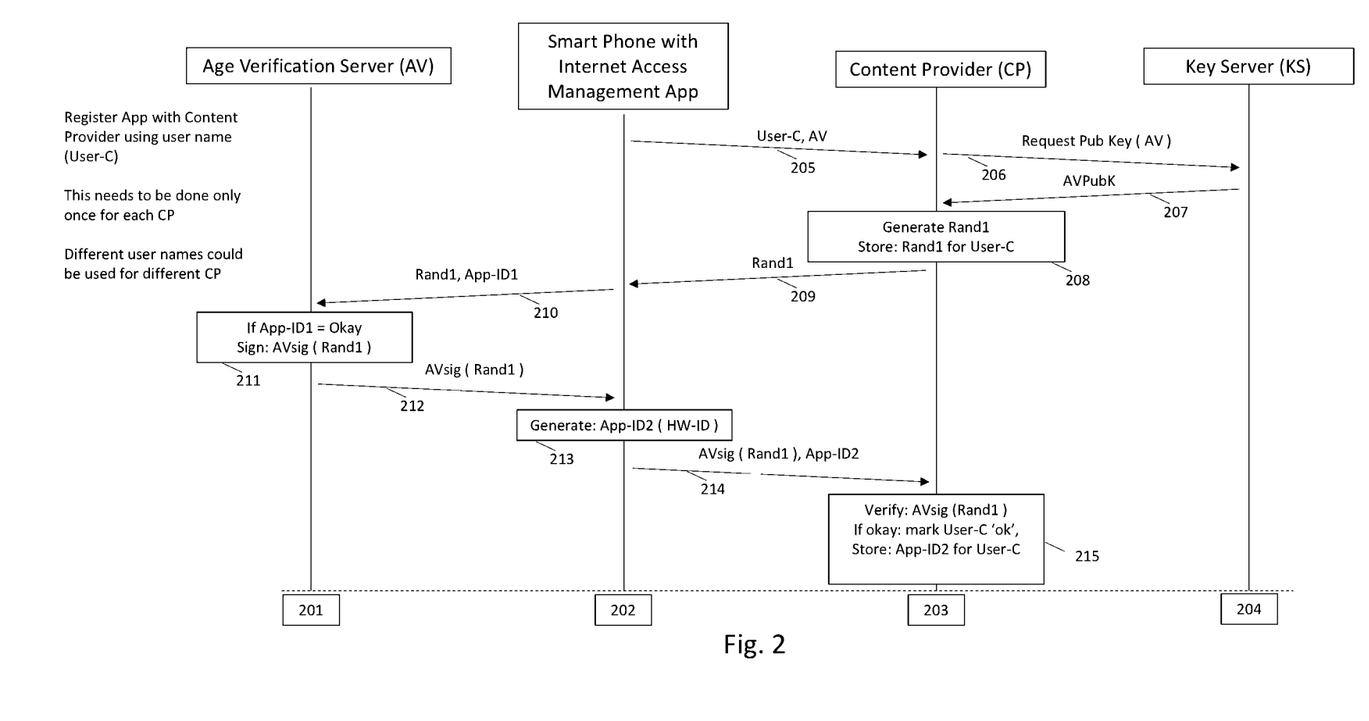
FIG. 2 illustrates a schematic showing one embodiment how a user registers with an age-restricted content provider.

Referring now in detail to FIG. 2, therein illustrated is a schematic of one step of the improved system and method for internet access age-verification as according to one embodiment of the invention. After the internet access management software application (App) has been installed on the smart phone of a user (202), and successfully registered with an age-verification server (201), the user must register the App with a content provider (203) to be able to access age-restricted content.

As in FIG. 1, FIG. 2 shows a logical layout of network elements and communication links between an age-verification server (AV) (201), a smart phone comprising an internet access management software application (App) (202), a content provider (203) and a public-encryption-key server (204) which provides the public key for legitimate users to decrypt files encoded with a private key.

To access age-restricted content, the user registers with an age-restricted content provider (203) using an internet access management software application (App), wherein during registration, the user registers using a unique pseudonym (User-C) and the App communicates the pseudonym together with the identity of the age-verification server [User-C, AV] to the content provider. After receiving the user registration request (205), the content provider requests (206) the public key (AVPubK) of the age-verification server (201) from a Public Key Server (204). The content provider receives the public key (AVPubK) (207), and then generates a new user identity (Rand1), and stores this identity (Rand1) for (User-C).

The content provider (203) then sends the temporary random identity Rand1 back to the App (209), and the App forwards Rand1 together with the unique combined software and hardware identity App-ID1(HW-ID) to the age-verification server (210).

The age-verification server determines that App-ID1(HW-ID) is associated with a stored data file for an age-verified user, in which case the age-verification server signs Rand1 with the private key (AVsig) of the age-verification server to produce AVsig(Rand1), which is then forwarded to the App associated with App-ID1(HW-ID) (211).

After the App receives AVsig(Rand1) (212) which confirms that the user is age-verified, the App generates a different unique combined software and hardware identity App-ID2(HW-ID)(213), in order to maintain anonymity of the hardware device from the content provider, which is sent together with AVsig(Rand1) to the content provider (214).

The content provider decodes AVsig(Rand1) using the public key of the age-verification server (AVPubK) to determine that decoded [AVsig(Rand1)] is identical to the stored (Rand1), and then the content provider stores the association of combined software and hardware identity App-ID2(HW-ID) with the anonymous user identity User-C (215).

In this way, an anonymous user identity has been used to register with an age-restricted content provider (203) such that an age-verification server (201) is able to confirm that the anonymous user (User-C) is registered with the age-verification server and authenticated to access the content, wherein the server identifies that the random identity (Rand1) is associated with an age-verified user (User-A), and the content provider validates and stores the anonymous user identity (Rand1) together with a unique hardware identity generated by the App for that content provider App-ID2(HW-ID) to enable the user to proceed now to access age-restricted content.

Figure 3:
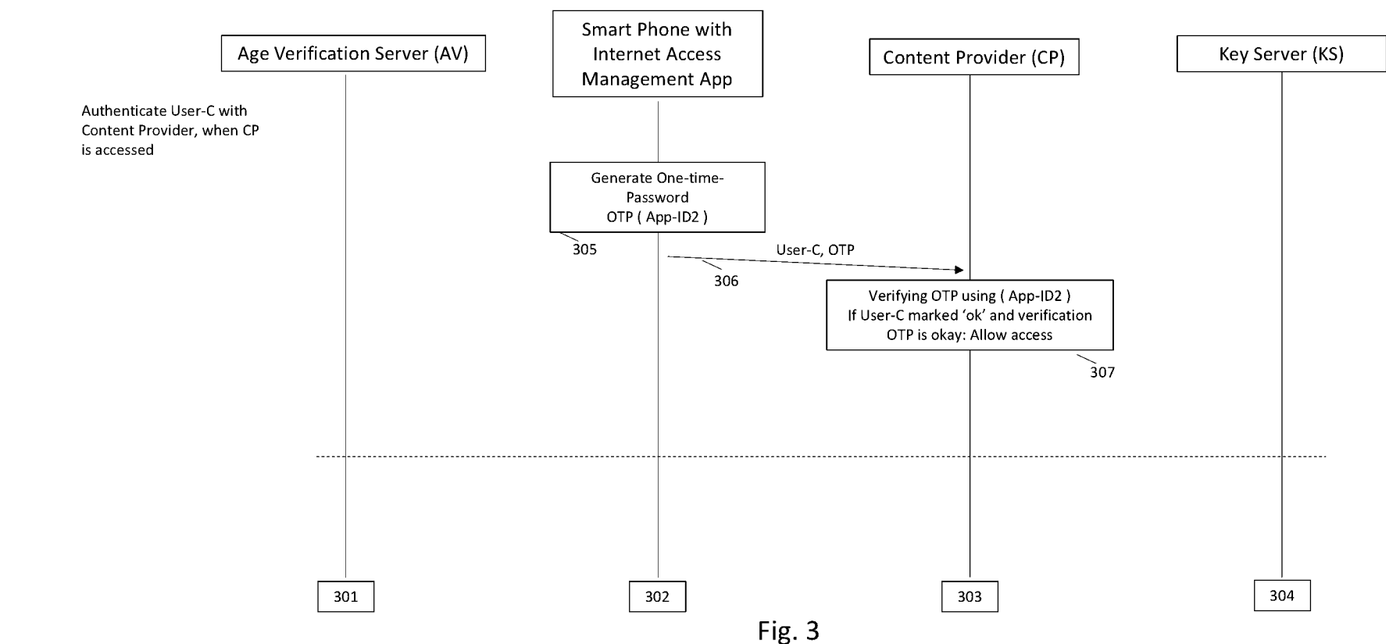
FIG. 3 illustrates a schematic showing one embodiment how a user accesses age-restricted content according to the invention.

Referring now in detail to FIG. 3, therein illustrated is a schematic of one step of the improved system and method for internet access age-verification as according to one embodiment of the invention. After the internet access management software application (App) (302) has been successfully registered with the content provider (303) such that the user has been age-verified to access age-restricted content, the user may now proceed to access the content.

As in FIG. 1 and FIG. 2, FIG. 3 shows a logical layout of network elements and communication links between an age-verification server (AV) (301), a smart phone comprising an internet access management software application (App) (302), a content provider (303) and a public-encryption-key server (304) which provides the public key for legitimate users to decrypt files encoded with a private key.

Following successful registration with the content provider, the registered user requests to access age-restricted internet content using an internet access management software application (App), and wherein the user is already registered and age-validated with that content provider as anonymous User-C, and wherein the content provider has stored a unique hardware identity for User-C as App-ID2 (HW-ID).

In one embodiment, the user selects the content provider from within the App, and enters the identity User-C, wherein the App (302) computes and generates a one-time password (OTP) (305) based upon the unique hardware identity App-ID2(HW-ID) stored within the App for this content provider (303), and or based upon a time-varying code which varies in time, e.g. changing every 30 seconds, relative to a time stamp generated uniquely when the device was registered with the content provider and which both the App (302) and the content provider (303) can compute, such that the one-time password (OTP) and the user identity User-C form an authentic user login, which the content provider can determine represent an authenticated anonymous age-verified user (User-C) having an authentic registered software application, and thus allowing the content provider (303) to permit access to the age-restricted content.

The one-time password is computed and sent to the content provider (306). The content provider computes the same OTP and compares it with the one received from User-C based on the stored unique hardware identity App-ID2(HW-ID) also stored by the content provider (303).

In different embodiments, it is the installed software App which computes the access authentication one-time password (OTP) which is identified as being in possession of the authenticated user of true identity (User-A) who is age-verified at the age-verification server, such that the smart phone may be used to generate the login one-time password, while access to the age-restricted content is performed on a separate computer linked to the internet. In different embodiments, the App may determine that internet access to age-restricted content may be performed on a separate computer, and may request biometric input, such as fingerprint scan, and or iris scan, and or face recognition, and or answers to unique personal security questions, before or during the login process to continue to verify that the true authenticated user is logging in to the age-restricted content, and thereby restrict access to true authenticated age-verified users who are in possession of the smart phone, upon which the App is installed.

In other embodiments, the content provider may present a QR-code on screen, which is a 2-dimensional bar code on the screen which the smart phone can capture and which is processed by the App. After processing the QR-code, the App requests entry of the anonymous user name (User-C) and computes a login based upon a derivative of the unique hardware identity for this content provider App-ID2(HW-ID). The QR-code is simply an alternative method to communicate the identity of the content provider and to cause the App to generate the login based on the anonymous user identity (User-C) and unique hardware identity App-ID2 (HW-ID).

Figure 4:
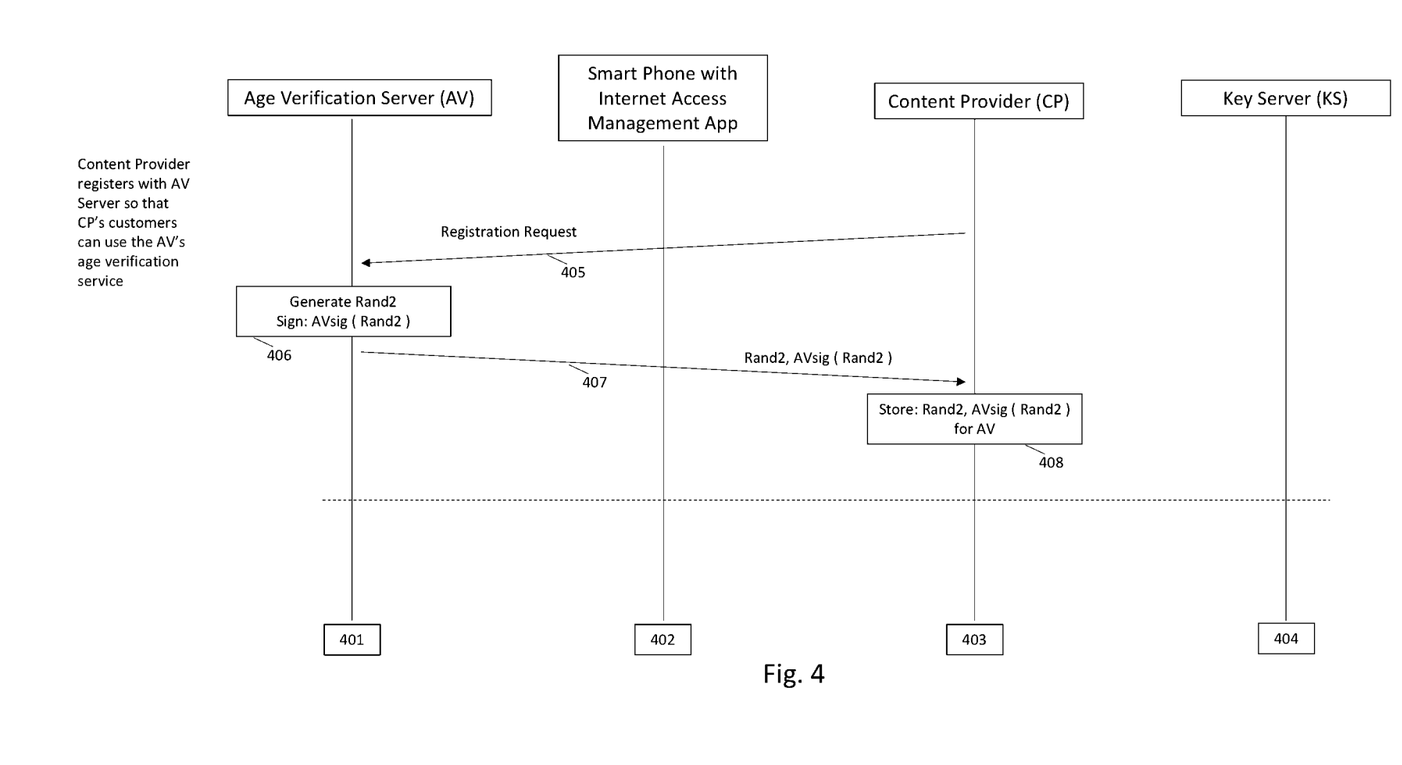
FIG. 4 illustrates a schematic showing one embodiment how a content provider registers with an age-verification server.

Referring now in detail to FIG. 4, therein illustrated is a schematic of one step of the improved system and method for internet access age-verification as according to different embodiments of the invention. In order to provide a regulatory environment for the content provider (403), each content provider must register with the age-verification server (401).

As in FIGS. 1 to 3, FIG. 4 shows a logical layout of network elements and communication links between an age-verification server (AV) (401), a smart phone comprising an internet access management software application (App) (402), a content provider (403) and a public-encryption-key server (404) which provides the public key for legitimate users to decrypt files encoded with a private key.

In different embodiments, registration of the content provider (403) provides the means to regulate the behavior of content providers such that failure to comply with regulations regarding age-verification processes, and the type of content shown, may cause their registration to be withdrawn. Registration of content providers provides the facility to require periodic renewal of the content provider registration such that content providers obtain a temporary and renewable license to operate. It costs money to operate an age-verification server (401), while the content providers benefit from marketing of their services through the internet access management software application, which is periodically updated with content providers according to different themes of adult content. The costs to run the age-verification server (401) could be covered by a subscription fee for using the app or by a fee for purchasing the app. Alternatively, the App may be downloaded and installed for free. In any case, it is reasonable to expect that the content providers will pay to register with the age-verification server, and or pay a subscription to operate, and or pay a percentage of their revenue in the instance that goods and or services are purchased via the App or that the App is used for authentication.

To register with the age-verification server (401), the content provider (403) may send a registration request (405) to the age-verification server (401). If the age-verification server approves the registration, it processes the request and generates a content provider identity (Rand2) as well as an encrypted file AVsig(Rand2) (406), wherein the content provider identity (Rand2) is signed with the private key of the age-verification server (401). This signed encrypted file provides an additional level of authentication to enable the App to determine that the content provider has a legitimate valid identity.

In different embodiments, the age-verification server may store the content provider identity (Rand2) and the signed content provider identity AVsig(Rand2).

After approval, the age-verification server confirms the registration and sends the content provider identity (Rand2) and the signed content provider identity AVsig(Rand2) back to the content provider (407). Upon receipt, the content provider stores the content provider identity (Rand2) and the signed content provider identity AVsig(Rand2) (408).

Figure 5:
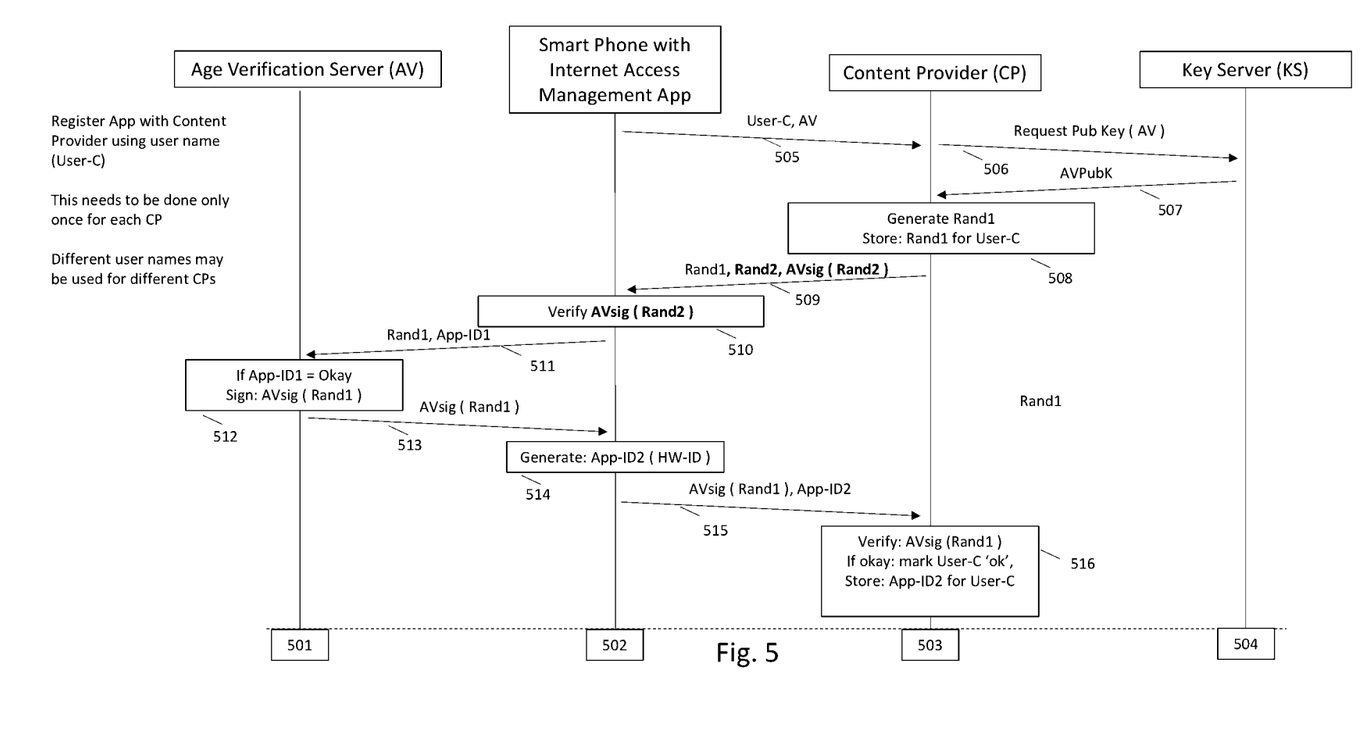
FIG. 5 illustrates a schematic showing a second embodiment how a user registers with an age-restricted content provider.

Referring now in detail to FIG. 5, therein illustrated is a schematic of an alternative embodiment of one step of the improved system and method for internet access age-verification.

As in FIGS. 1 to 4, FIG. 5 shows a logical layout of network elements and communication links between an age-verification server (AV) (501), a smart phone comprising an internet access management software application (App) (502), a content provider (503) and a public-encryption-key server (504) which provides the public key for legitimate users to decrypt files encoded with a private key.

In this alternative process of registration by a user to access age-restricted content, an additional step is added so that the App itself (502) can determine that the content provider (503) is authentic and currently registered with the age-verification server (501).

Similar to the description given with reference to FIG. 2, in this alternative embodiment, the user registers with an age-restricted content provider (503) using an internet access management software application (App), wherein during registration, the user registers using a unique pseudonym (User-C) and the App communicates the pseudonym together with the identity of the age-verification server [User-C, AV] to the content provider. After receiving the user registration request (505), the content provider requests (506) the public key (AVPubK) of the age-verification server (501) from a Public Key Server (504). The content provider receives the public key (AVPubK) (507), and then generates a new user identity (Rand1), and stores this identity (Rand1) for (User-C).

In this alternative step, the content provider (503), in addition to sending (Rand1) to the App, additionally sends the registration identity (Rand2) received from the age-verification server (501) as well as the registration identity signed with the private key of the age-verification server AVsig(Rand2) (509). This provides the means for the App to verify that the content provider is genuine and authentic and registered with the age-verification server (501).

The App applies the public key of the age-verification server to decode AVsig(Rand2), and determines that the decoded AVsig(Rand2) is equal to (Rand2) (510), thereby confirming authenticity of the content provider (503).

Following verification of the content provider (503), the App forwards Rand1 together with the unique combined software and hardware identity App-ID1(HW-ID) to the age-verification server (511).

The age-verification server determines that App-ID1(HW-ID) is associated with a stored data file for an age-verified user, in which case the age-verification server signs Rand1 with the private key (AVsig) of the age-verification server to produce AVsig(Rand1) (512), which is then forwarded to the App associated with App-ID1(HW-ID) (513).

After the App receives AVsig(Rand1), which provides the means to confirm to the content provider that the user is age-verified, the App generates a different unique combined software and hardware identity App-ID2(HW-ID) (514), in order to maintain anonymity of the hardware device from the content provider, which is then sent together with AVsig(Rand1) to the content provider (515).

The content provider decodes AVsig(Rand1) using the public key of the age-verification server (AVPubK) to determine that decoded AVsig(Rand1) is identical to the stored (Rand1), and then the content provider stores the association of combined software and hardware identity App-ID2(HW-ID) with the anonymous user identity User-C (516).

In this way, an anonymous user identity has been used to register with an age-restricted content provider (503) such that an age-verification server (501) is able to confirm that the anonymous user (User-C) is registered with the age-verification server and authenticated to access the content, wherein the server identifies that the random identity (Rand1) is associated with an age-verified user (User-A), and the content provider validates and stores the anonymous user identity (Rand1) together with a unique hardware identity generated by the App for that content provider App-ID2(HW-ID) to enable the user to proceed now to access age-restricted content.

Figure 6:
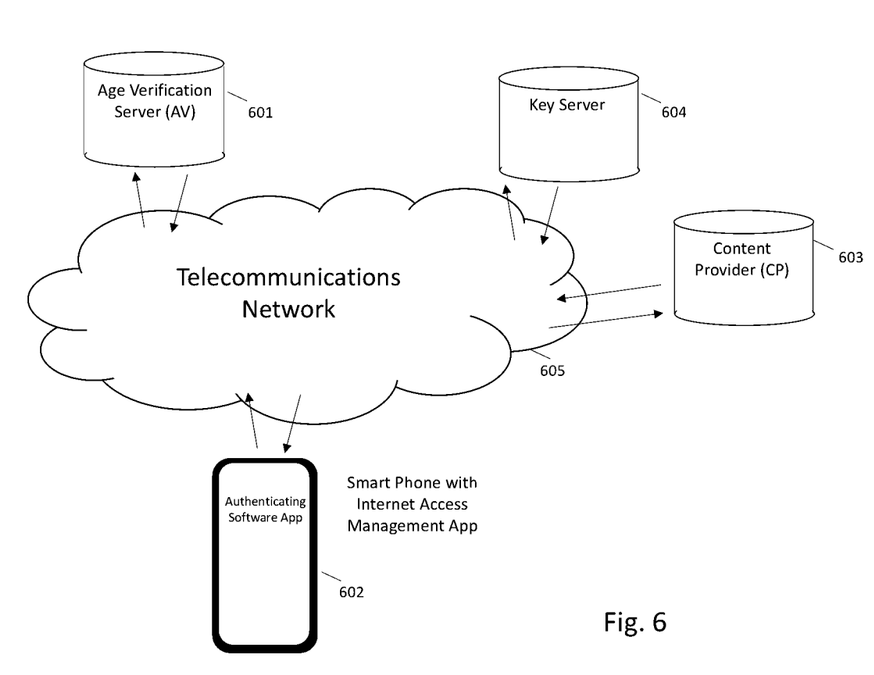
FIG. 6 illustrates a schematic showing the physical layout of the different devices communicating across a telecommunications network according to the current invention.

Referring now in detail to FIG. 6, therein illustrated is a schematic of the physical layout of the improved system and method for internet access age-verification according to the preferred embodiment.

As in FIGS. 1 to 5, FIG. 6 shows the physical layout of network elements and communication links between an age-verification server (AV) (601), a smart phone comprising an internet access management software application (App) (602), a content provider (603) and a public-encryption-key server (604), which provides the public key for legitimate users to decrypt files encoded with a private key.

For clarity, in the preferred embodiment, a smart phone is shown comprising a software application for managing Internet access. This comprises the authenticating device according to the invention in this embodiment. The authenticating device communicates with the age verification server (601), the Content Provider (603), and the Key Server (604) across the telecommunications network (605).

According to FIG. 6, it can be understood that the smart phone (602) acts as a single subscriber communicating wirelessly over the telecommunications network (605). Updates to the authentication software App may be made wirelessly across the network and sent from the age verification server. In different embodiments, updating the software may be done via a separate software update sent from an authenticated update server (not shown). Checking the integrity of the authenticating software App may be done directly by the age verification software. In different embodiments, software integrity checking may be done via a separate software integrity checking server (not shown).

In particular, the invention has provided a safe and secure method for an anonymous user to register with an age-restricted content provider such that an age-verification server is able to confirm that the user is authenticated to access the content, while the App also determines that the content provider is authentic and approved. The invention enables the server to identify that the random identity is associated with a true age-verified user, wherein the content provider then stores the validated anonymous user identity together with a unique hardware identity to enable the user to access the content.

The invention thus provides a comprehensive solution to age-verification control of age-restricted internet content using an internet access management software application (App). While the preferred embodiment has emphasised the use of a smart phone, this is given by way of example only, and the invention is not limited to this type of device. All manner of multimedia devices may be used such as a laptop, a computer, an iPad, an iPhone, a tablet etc. It is to be understood that the aforementioned multimedia devices generally comprise: a data processing platform, a screen, computer memory, a fixed internet access communication capability and or a radio internet access communication capability, which may use any radio telecommunications standard, wherein the device comprises an antenna and radio telecommunications software and hardware, a data processing software and or the means to process image data such as QR-codes or other 2 dimensional barcodes, an operating system, and data encryption software and a data decryption software, a power supply, and all other common hardware and software functionality found in multimedia devices such as software capable of processing biometric data where it is needed according to different embodiments of the invention.

In the context of the current invention, in a preferred embodiment, the age verification server is a computer capable of processing requests and delivering data to other computers and other wirelessly connected devices over the internet or over local networks. The server may comprise a web server delivering web pages, which are capable of being accessed over the Internet using a web browser such as Internet Explorer, Chrome, Firefox, Opera, Safari, etc.

According to different embodiments, the age verification server may comprise a single server capable of processing many different operations, or the age verification server may comprise several servers each dedicated to different processing tasks such as age verification, software updates, software integrity checking, content provider registration, and authentication and encryption. The server may also include functionality to upload and backup files online through a cloud storage system or via online backup services according to different use requirements.

The server comprises both server hardware and server software, wherein the hardware needed is designed to support the number of server clients accessing the server software services.

In different embodiments, the server architecture may employ a client-server networking model integrating websites and communication services.

Different embodiments of the communications between the age verification server, the content provider, and the authenticating devices may also employ peer-to-peer networking functionality, wherein pluralities of devices on a network may function as either a server or a client on an as-needed basis. This offers a greater degree of privacy and may be used in low traffic instances.

The age verification server may also comprise a server cluster where computing resources are shared to maximize processing efficiency.

Content may be provided in a diverse number of ways and the invention is not strictly limited to Internet websites. The invention is equally applicable to providing a means to manage and restrict access to software platforms which enable age-restricted content to be uploaded such as:

Search engines which facilitate access to age-restricted content,
discussion fora and communities in which users post links to age-restricted content,
cyberlockers' and cloud storage services on which age-restricted content may be stored,
services including websites and App marketplaces that enable users to download Apps to access age-restricted content,
hosting services which enable access to websites having age-restricted content,
mobile applications and other devices that can connect directly to streaming servers where age-restricted content can be accessed.

In the instance that the consumer is accessing age-restricted content which is not free, such as payment for films, and or payment to use gambling sites, wherein the consumer wishes to remain completely anonymous, the consumer may purchase cryptocurrency and store this cryptocurrency in an electronic wallet associated with the software application App. In this way, no personal details are transmitted to the gambling site when making payment to place bets on various gambling games.

As disclosed, the present invention relates to a method performed by an authenticating device, for registering the authenticating device with a content provider, wherein, the content provider offers the content to a customer via, for example, a web site and the customer needs to sign-up to use the service by selecting a user name. The customer accesses the content using a device which may be any one of: a mobile device, a fixed computer device, a laptop computer, a mobile phone, a multimedia device, a tablet, an iPad, an iPhone, or similar device having Internet access capability, wherein each device is equipped with an authentication software app, which together form the said authenticating device.

For clarification, there are several different scenarios possible regarding how the customer may access the content. The customer may access the content using the authenticating device itself, i.e., the same smartphone, tablet etc., on which the authenticating software app is installed. Alternatively, the customer may access and view the content on a second device, such as via a personal computer, after authentication has been performed on a first device, but this second device may also be a smartphone, tablet etc. In the following part of the description, the device used for accessing and viewing the content, which is different from the device used for authentication, is referred to as a display device.

The principles of the present invention are the same, whether the customer uses the authenticating device, or the display device, to access and view the content. There are however differences regarding the implementation of the data transfer from the authenticating device to the content provider.

The content provider may be implemented as a web server, which is configured to communicate with the display device and or the authenticating device. Alternatively, the content provider may be implemented as a computer system with a network connection, such as a connection to the Internet, comprising a software system implementing its functionality. When accessing the content using the authenticating device, the communication between the authenticating device and the content provider may be done using a communications link, similar to the one, which was used to first initiate the age verification process. All communication links established as part of the described method and system may be encrypted.

In the case where the content is accessed and viewed using a display device, the authenticating device could establish a communications link to the content provider, which is separate from the link used by the display device to access the content. In addition, the information that the authenticating device needs to receive, may also be input differently, e.g. typed in by the customer, or retrieved by scanning a bar code, preferably a 2D bar code, such as a QR Code. Information that is to be sent to the content provider, may be displayed by the authenticating device, e.g. in the form of a PIN number, such as a numeric or alpha-numeric code of a particular length, e.g. 4 to 10 digits.

When starting the process to register the authenticating device with a content provider, the content provider requires information regarding the customer, and in the case that more than one age verification method is accepted by the content provider, an indication is required regarding which age verification server is to be used. This customer information, and age-verification-server information, may be communicated by the authenticating device using the same communications link, in the instance that the content is accessed via the authenticating device, or via a separate communications link when using the display device to access the content. Alternatively, the customer provides this information to the content provider using the display device, e.g. by using a computer mouse, keyboard, voice command or any other input interface provided by the display device.

The content provider uses the information identifying the age verification server, to verify that the information returned from the age verification server is authentic. Since, the verification of such information will take place at a later stage in the process, after the authenticating device has been registered with a content provider, the information may also be provided at a later point in time.

In a preferred embodiment, the information returned by the age verification server will be digitally signed by the age verification server using Public Key cryptography, also referred to as asymmetrical cryptography. In such a cryptographic system, pairs of keys are used, namely public keys, which may be disseminated widely, and private keys which are known only to the owner, such as PGP (Pretty Good Privacy) and the like. The public key is, for example, used to verify whether an electronic signature is authentic. The content provider therefore needs to obtain the public key that corresponds to the private key used by the age verification server. The content provider may access a key server to retrieve the age verification server's public key or it may retrieve it directly from the age verification server. The content provider may also store the age verification server's public key for later use, so that it is not required by the content provider to retrieve the key each time a new customer registers an authenticating device.

As part of the registration process, the authenticating device receives a number, referred to in the Figures as Rand1, which is issued by the content provider. This number (Rand1) may be any binary sequence, or any binary sequence represented by any numeric or alpha numeric representation, or by a graphical image, such as a bar code. Preferably, the number (Rand1) is a random number, or based on a random number. The term random number may also include pseudo-random numbers, i.e. those generated from a sequence of numbers whose properties approximate the properties of sequences of random numbers.

The authenticating device may receive the number (Rand1) via the aforementioned communications link. Alternatively, the number (Rand1) may be input via any input interfaces included in the authenticating device, such as keyboard, including on screen keyboards, touch screen, voice command or, in the case that the authenticating device includes a camera, it may be input via the camera, i.e. as a graphical representation of the number, such as a bar code, that is captured and decoded.

The content provider stores the number (Rand1) for later use, for example, in a database, together with the customer's user name. Preferably, the content provider is able to retrieve the number from the database with a query based on the customer's user name.

The authenticating device establishes a communications link with the age verification server. The authenticating device sends the number (Rand1) together with an identifier to the age verification server. The identifier, referred to in the figures as App-ID1, may be any binary sequence in any representation, which identifies the authenticating device. The identifier may comprise any kind of hardware identifier of the authenticating device, such as, for example, a hardware identifier of the smartphone etc. on which the authenticating software app is installed. Preferably, the identifier is a derivative of the actual hardware identifier generated by the authenticating software app, which is used to uniquely identify the authenticating device to the age verification server. The derivative of the identifier, may, for example, be the result of a function, such as a hash function computed by taking the actual hardware identifier as an input parameter, so that different values are generated on different authenticating devices.

In order to be able to generate different identifiers, such as a first identifier for communication with the age verification server, and a different identifier for the communication with each content provider, a function may be used to generate the identifier that takes two parameters, one of which is the authenticating device's hardware ID, and the other one is a use-specific identifier, which is different for each content provider, and different for the age verification server. An example of a function used for this purpose is HMAC (hash-based message authentication code), which calculates a hash from a message using a secret cryptographic key. The cryptographic key may comprise the authenticating device's hardware ID, and the message may comprise the use-specific identifier.

Additionally, the age verification server may comprise the functionality to check that the authenticating software app is unaltered and operating correctly, i.e. by performing an integrity check of the said authenticating software app and or verifying the authenticity of the authenticating device. This may be done as part of establishing a communications link to an age verification server. Only in the instance that the integrity of the authenticating software app has been confirmed and or the authenticity of the authenticating device has been verified, will the age verification server continue the authentication and or registration process.

In order to avoid that any additional information is conveyed to the age verification server from the content provider using the number (Rand1), the number (Rand1) itself could be scrambled, e.g. by a hash function, or combined with another value to strip it from any hidden information. In this case, the content provider must apply the same processing operation to the number before verifying any digital signature.

The identifier App-ID1 is already known to the age verification server, since the authenticating device is registered with the age verification server before it is used to register with a content provider. During the registration of the authenticating device with the age verification server, the age verification server proves that the customer is of a given age. This may be done using various established methods explained earlier in the context of the different embodiments. In this process, the age verification server stores the customer's age, or date of birth, or age group, in a database together with the customer's user name which is used for communication with the age verification server. The customer's user name, referred to in the figures as User-A, may be the customer's real name, or any made up data string, that uniquely identifies the customer to the age verification server.

The age verification server maintains a database keeping the relation between the customers and their identifiers. The database may be implemented as a web server configured to communicate with the authenticating devices, such as a computer system having a network connection to the Internet and comprising a software system implementing the required functionality. In addition, the age verification server may be configured to digitally sign numbers using its private key, in order to enable the content provider to verify that the age verification server has confirmed the age of a particular customer using an authenticating device, which is registered with the age verification server.

When the age verification server receives the identifier App-ID1 from the authenticating device, together with the number issued by the content provider, the age verification server queries the database to determine whether there is an authenticating device registered under the given identifier. If that is the case, then the age verification server digitally signs the number, and sends back the digital signature, in the figures referred to as AVsig(Rand1), to the authenticating device.

The authenticating device forwards the digital signature, together with a second identifier, to the content provider. The second identifier, referred to in the figures as App-ID2, may be any binary sequence in any representation identifying the authenticating device. The second identifier may be any kind of hardware identifier of the authenticating device, i.e. a hardware identifier of the smartphone etc. on which the authenticating software app is installed. Preferably, it is a derivative of the actual hardware identifier generated by the authenticating software App, and used to uniquely identify the authenticating device to the age verification server. The identifier derivative may, for example, be the result of a function taking the actual hardware identifier as an input parameter, so that different values are generated on different authenticating devices, such as a hash function. The identifier derivative, may be the same as the identifier App-ID1, but preferably, each would be a different for each content provider.

In different embodiments, the authenticating device may authenticate itself towards the content provider, by generating and providing a one-time-password based on the second identifier, which is known both to the authenticating device and to the content provider. The one-time-password may be generated according to the Time-based One-time Password Algorithms (OATH-TOTP) according to RFC 6238 or others.

In the case that the age verification server is required to confirm different age limits, such as 'over 16 years old', 'over 18 years old', 'over 21 years old' etc., the communication from the content provider that includes the number (Rand1) may further include the age limit to be confirmed. In this instance, the age verification server may then digitally sign the number (Rand1) and the age limit, either individually or combined. This provides the certainty to the content provider that the customer is of the right age, without disclosing the actual age of the customer.

In particular, one embodiment of the invention further provides the additional capability for the authenticating software App to provide different levels of Internet access according to different age-restricted content criteria. The content provider may thus allow different classes of Internet access to content according to different access privileges and or according to the age of the consumer requesting access. In this way the content provider may act as an Internet access gateway towards different age-restricted content wherein the consumer may only access a certain class of Internet content according to whether they have verified that they are indeed of the necessary age to access and view the content.

The invention also further assists the regulation of the Internet by providing independent content providers, such as persons uploading content to YouTube, with the facility to age-restrict the material they upload according to acceptable criteria. While the YouTube content providers may remain anonymous, and thus free speech and views may be freely expressed, a further requirement may be that websites which offer this uploaded content, will require a means to authenticate these anonymous content uploaders. Such authentication may also come via the age verification server, or other authentication server. This means that absolute anonymity can be excluded such that offensive material and incorrectly age-restricted material may be eventually traced to particular individuals in the worst cases. In general cases, it is anticipated that those complying with the general rules on age-restriction will add an age-restriction class, and where content is reported by viewers that it possibly does not comply with the regulations, the content may be assessed by an Internet regulation ombudsman such that it may be blocked, or the content age-restriction class may be modified.

In terms of internet regulation, the requirement that single users posting content are ultimately indirectly traceable via an age-verification server, means that they will be less likely to post offensive material and the Internet will have fewer offensive images or videos.

As a further extension of improved Internet Regulation, according to different embodiments of the invention, the software App running on the multimedia device can provide different levels of anonymity. Whenever consumers are passively viewing internet content, complete anonymity can be provided by generating a unique App ID(CPn) for each different content provider e.g. App-ID(CP1), App-ID(CP2), App-ID(CP3) etc. for content providers CP1, CP2, CP3, which is different from the unique App ID (App-ID1(HW-ID)) that is used when communicating with the age verification server. This solution provides absolute anonymity because there is no relation between any App-ID(CPn) and App-ID1(HW-ID). Nevertheless, Internet regulation requires an increasing level of accountability and where consumers are seeking to contribute content to websites, there needs to be in place a means to trace the legitimate origin of the content. To address this, the invention provides the means on the software App to select one of a number of content providers which may be divided into different classes, wherein one class may be those websites where a consumer wishes to upload content and or provide personal opinions and comments etc. In this case, traceability can be provided by the software App using the same App-ID for both communicating with the Content Provider and communicating with the age verification server. In this way, when a consumer writes a comment or uploads some content, they accept responsibility for their contribution, fully knowing and understanding that ultimately, their identity can be determined via App-ID1(HW-ID) which is linked to their identity at the age verification server.

The current invention of a system and method for age verification based on anonymity, also creates a very new business model. According to the invention, the identities of the users remain hidden and their private data is not transferred, and thus content providers and service providers no longer acquire user-data to sell. At first hand this may seem a less attractive business model, which content providers and service providers will be less likely to support. This view is not, however, the view held by consumers who are growing increasingly concerned about the loss, sale, and or misuse of their private data. The inventors believe that in this growing age of increasing accountability when using social media and multimedia platforms, services which protect consumers personal data will be more attractive and will displace services based on the data-centric model in which huge amounts of personal data is gathered and resold to third party companies.

While only several embodiments of the present invention have been described in detail, it will be obvious to those persons of ordinary skill in the art that many changes and modifications may be made thereunto without departing from the spirit of the invention. The present disclosure is for illustration purposes only and does not include all modifications and improvements, which may fall within the scope of the appended claims.

The invention claimed is:

1. A method performed by an authenticating device for registering said authenticating device with a content provider, the method comprising:
receiving a number and a required age limit to be confirmed by an age verification server, both issued by said content provider, whereby said number does not enable said age verification server to identify said content provider, wherein the required age limit is a biological age of a user;
establishing a communications link to said age verification server;
sending said number, said age limit and a first identifier to said age verification server, wherein said first identifier identifies said authenticating device to said age verification server;
receiving from said age verification server a digital signature of said number and a digital signature of said age limit, the digital signature of said number and the digital signature of said age limit being generated by said age verification server when the age-verification server determines that said first identifier is associated with stored data for a user who meets the required age limit; and
sending said digital signature of said number, said digital signature of said age limit and a second identifier to the content provider, so that said authenticating device can subsequently authenticate itself to said content provider based on said second identifier, whereby said second identifier is different from said first identifier to allow anonymity between said content provider and said user who meets the required age limit;
subsequently, after sending said digital signature of said number, said digital signature of said age limit and said second identifier to the content provider, generating a one-time-password based on said second identifier;
establishing a communications link to said content provider and sending said one-time-password in an access request to said content provider;
receiving access permission to access data provided by said content provider, when said content provider has determined, based on said one-time-passwords, that the access request is from an authenticating device that is registered with said content provider;
accessing data provided by said content provider.

2. The method according to claim 1, wherein said second identifier is further based on a use-specific identifier.

3. The method according to claim 1, wherein said authenticating device is at least one selected from the group consisting of: a fixed computer device, a laptop computer, a mobile phone, a multimedia device, a tablet, an iPad, an iPhone, and wherein said authenticating device comprises an installed authenticating software app, and wherein establishing a communications link to the age verification server includes verifying the integrity of said authenticating software app by said age verification server.

4. The method according to claim 1, wherein said number is a random or pseudo-random number.

5. The method according to claim 1, wherein said authenticating device has a hardware ID and wherein said first identifier and or said second identifier is based on said hardware ID.

6. The method according to claim 1, wherein said digital signature is created using public key cryptography.

7. The method according to claim 1, wherein said digital signature of said number and said digital signature of said age limit may be either individual signatures or a combined signature.

8. A method performed by a content provider for registering an authenticating device with said content provider, the method comprising:
sending a number and a required age limit, to be confirmed by an age verification server, to said authenticating device to be forwarded by said authenticating device with a first identifier to said age verification server, wherein said first identifier identifies said authenticating device to said age verification server, wherein said number does not enable said age verification server to identify said content provider;
receiving a digital signature of said number and a digital signature of said age limit, wherein the digital signature of said number and the digital signature of said age limit being generated by said age verification server when said age-verification server determines that said first identifier is associated with stored data for a user who meets the required age limit; and
receiving a second identifier from said authenticating device, so that said content provider can subsequently verify the authenticity of said authenticating device based on said second identifier, whereby said second identifier is different from said first identifier to allow anonymity between said content provider and said user who meets the required age limit;
subsequently, after receiving said second identifier from said authenticating device, receiving a one-time-password based on said second identifier in an access request from said authenticating device;
sending to said authenticating device an access permission to access data provided by said content provider, when said content provider has determined, based on said one-time-passwords, that said access request is from an authenticating device that is registered with said content provider;
allowing access to data provided by said content provider.

9. The method according to claim 8, wherein said authenticating device is at least one selected from the group consisting of: a fixed computer device, a laptop computer, a mobile phone, a multimedia device, a tablet, an iPad, an iPhone, and wherein said authenticating device comprises an installed authenticating software app.

10. The method according to claim 8, wherein said number is a random or pseudo-random number.

11. The method according to claim 8, wherein said authenticating device has a hardware ID and wherein said first identifier and or said second identifier is based on said hardware ID.

12. The method according to claim 8, wherein said digital signature is created using public key cryptography.

13. The method according to claim 8, wherein said digital signature of said number and said digital signature of said age limit may be either individual signatures or a combined signature.

14. An authenticating device for age-verification towards a content provider, wherein said authenticating device being configured to receive a number and a required age limit issued by said content provider, whereby said number does not enable said age verification server to identify said content provider, establish a communications link to said age verification server, send said number, said age limit and a first identifier to said age verification server, wherein said first identifier identifies said authenticating device to said age verification server, receive from said age verification server a digital signature of said number and a digital signature of said age limit, wherein the digital signature of said number and the digital signature of said age limit being generated by said age verification server if when the age-verification server determines that said first identifier is associated with stored data for a user who meets the required age limit, and send said digital signature of said number, said digital signature of said age limit and a second identifier to the content provider, so that said authenticating device can subsequently authenticate itself to said content provider based on said second identifier, whereby said second identifier is different from said first identifier to allow anonymity between said content provider and said user who meets the required age limit;

generate a one-time-password based on said second identifier;

establish a communications link to said content provider and send said one-time-password in an access request to said content provider;

receive access permission to access data provided by said content provider, when said content provider has determined, based on said one-time-passwords, that the access request is from an authenticating device that is registered with said content provider;

access data provided by said content provider.

15. The authenticating device according to claim 14, wherein said authenticating device is at least one selected from the group consisting of: a fixed computer device, a laptop computer, a mobile phone, a multimedia device, a tablet, an iPad, an iPhone, and wherein said authenticating device comprises an installed authenticating software app, and wherein said authenticating device is configured to verify the integrity of said authenticating software app to said age verification server.

16. The authenticating device according to claim 14, wherein said number is a random or pseudo-random number.

17. The authenticating device according to claim 14, wherein said authenticating device has a hardware ID and wherein said first identifier and or said second identifier is based on said hardware ID.

18. The authenticating device according to claim 14, wherein said digital signature is created using public key cryptography.

19. The method according to claim 14, wherein said digital signature of said number and said digital signature of said age limit may be either individual signatures or a combined signature.

20. A content provider for age-verification, wherein said content provider is configured to send a number and required age limit, to be confirmed by an age verification server, both issued by said content provider to said authenticating device to be forwarded by said authenticating device with a first identifier to said age verification server, wherein said first identifier identifies said authenticating device to said age verification server, wherein said number does not enable said age verification server to identify said content provider, receive a digital signature of said number and a digital signature of said age limit, wherein the digital signature of said number and a digital signature of said age limit being generated by said age verification server if when said age-verification-server determines that said first identifier is associated with stored data for a user who meets the required age limit, and receive a second identifier from said authenticating device, so that said content provider can subsequently verify the authenticity of said authenticating device based on said second identifier, whereby said second identifier is different from said first identifier to allow anonymity between said content provider and said user who meets the required age limit;

receive a one-time-password based on said second identifier in an access request from said authenticating device;

send to said authenticating device an access permission to access data provided by said content provider, when said content provider has determined, based on said one-time-passwords, that said access request is from an authenticating device that is registered with said content provider;

allow access to data provided by said content provider.

21. The content provider according to claim 20, wherein said number is a random or pseudo-random number.

22. The content provider according to claim 20, wherein said digital signature is created using public key cryptography.

23. The method according to claim 20, wherein said digital signature of said number and said digital signature of said age limit may be either individual signatures or a combined signature.

* * * * *

UNITED STATES PATENT AND TRADEMARK OFFICE
CERTIFICATE OF CORRECTION

| | | |
|---|---|---|
| PATENT NO. | : 12,063,311 B2 | Page 1 of 1 |
| APPLICATION NO. | : 16/972325 | |
| DATED | : August 13, 2024 | |
| INVENTOR(S) | : Philip Wesby | |

It is certified that error appears in the above-identified patent and that said Letters Patent is hereby corrected as shown below:

On the Title Page

Item (54) and in the Specification (at Column 1, Lines 1-2), please replace "SYSTEM AND METHOD FOR INTERNET ACCESS AGE-VERIFICATION" with -- IMPROVED SYSTEM AND METHOD FOR INTERNET ACCESS AGE-VERIFICATION --

In the Claims

In Claim 14 (at Column 23, Line number 24), please replace "if when" with -- when --

In Claim 20 (at Column 24, Line number 26), please replace "if when" with -- when --

Signed and Sealed this
Seventh Day of January, 2025

Derrick Brent
*Acting Director of the United States Patent and Trademark Office*